(12) United States Patent
Bode et al.

(10) Patent No.: US 6,640,614 B1
(45) Date of Patent: Nov. 4, 2003

(54) PACKAGE BURST PRESSURE SIMULATOR

(75) Inventors: John H. Bode, Eden Prairie, MN (US); Mark D. Evans, West St. Paul, MN (US); Slava Berezovskiy, Apple Valley, MN (US)

(73) Assignee: Molon, Inc., Minneapolis, MN (US)

( * ) Notice: Subject to any disclaimer, the term of this patent is extended or adjusted under 35 U.S.C. 154(b) by 0 days.

(21) Appl. No.: 10/196,818

(22) Filed: Jul. 17, 2002

(51) Int. Cl.[7] .......................... G01L 27/02; G01M 3/26
(52) U.S. Cl. .................. 73/37; 73/1.01; 73/1.16; 73/1.35; 73/1.36; 73/1.57; 73/1.66; 73/1.71
(58) Field of Search ...................... 73/37, 1.01, 1.16, 73/1.35, 1.36, 1.57, 1.63, 1.64, 1.66, 1.71

(56) References Cited

U.S. PATENT DOCUMENTS

| | | | | |
|---|---|---|---|---|
| 3,934,464 A | * | 1/1976 | McCauley | 73/837 |
| 4,356,720 A | * | 11/1982 | Betts | 73/37 |
| 4,375,162 A | * | 3/1983 | Eppley | 73/37 |
| 4,793,179 A | * | 12/1988 | Carlson | 73/753 |
| 4,916,936 A | * | 4/1990 | Wilson | 73/37 |

FOREIGN PATENT DOCUMENTS

JP    6-58836    *  3/1994    .................. 73/40

* cited by examiner

Primary Examiner—Daniel S. Larkin
(74) Attorney, Agent, or Firm—Paul L. Sjoquist

(57) ABSTRACT

An apparatus and method for simulating a package pressure burst condition for calibrating a package pressure burst detector, where the package pressure burst detector is connected to a pressure tank, and the detector applies an air flow into the tank to gradually increase the tank pressure, and the tank has an output relief conduit connected to a pressure relief valve via a pressure switch, wherein the pressure relief valve is activated for a predetermined time when the pressure switch detects a preset pressure in the tank.

9 Claims, 4 Drawing Sheets

PACKAGE BURST PRESSURE SIMULATOR

BACKGROUND OF THE INVENTION

The present invention relates to instruments for testing sealed packages for burst strength; more particularly, the invention relates to an apparatus for calibrating such an instrument, to ensure that the instrument provides accurate and repeatable measurements.

One such instrument which may be used for flexible and rigid package testing is manufactured by the assignee of the present invention, under the designation SKYE Model 2000a. The SKYE Model 2000a is a microprocessor-controlled package test system that gives a measurement of package integrity and seal strength. The instrument may be used with a needle apparatus for puncturing the package to enable the instrument to selectively pressurize the interior volume to a predetermined amount, and to monitor the interior volume pressure, to determine whether the package can maintain a certain pressure without leaking, or to determine the actual burst pressure.

When the instrument is used for pressure burst testing of a package, a needle is first sealably penetrated into the package, and an air tube from the instrument is connected to the needle. The computer processor which is part of the instrument is set to gradually increase the air pressure inside the package, while monitoring the internal pressure. When the pressure rises to a value to cause the package to burst, the sudden drop in package internal pressure is monitored and recorded.

Burst testing is normally done by periodically removing a package from the assembly line, using some statistical sampling procedure, and using the instrument to ascertain whether the packages produced on the assembly line statistically meet the design requirements for the packages.

A problem in using such instruments can occur when more than one instrument is used for testing the same type of package on an assembly line, for even though each particular instrument produces accurate and repeatable measurement results, it is difficult to ensure that two or more different instruments will test to exactly the same absolute burst pressure value, because of variations between instruments and test set-ups. Likewise, when an instrument is used on many different days for the same package type testing, it is difficult to ensure that all packages tested on different days are being stressed to the same absolute pressure levels. What is needed is a test or calibration device which can be connected to any of a number of package burst detector instruments to ensure that all instruments are set to the same test conditions. The present invention meets this need, and provides a device for calibration of any test instrument to the same set of test conditions as any other similar test instrument.

SUMMARY OF THE INVENTION

The present invention comprises a device for calibrating a burst pressure detector for measuring burst pressure of packages, the device including a pressure container capable of being pressurized to predetermined pressures by the burst pressure detector via an input pressure port. A second port to the pressure container is connected to a pressure relief solenoid valve via an electrical pressure switch, which may be preset to any desirable burst pressure, which itself is electrically connected to a timer relay. When the pressure in the pressure container reaches the preset value of the pressure switch, the switch activates the timer and the timer activates the pressure relief solenoid valve, which vents the pressure from the pressure container to atmosphere. The timer continues to vent the pressure for the preset time of the timer, and then deactivates the pressure relief solenoid. A further port on the pressure container is connectable to a pressure sensor in the burst pressure detector, to enable the detector to monitor and record the burst pressure.

It is a principal object and advantage of the present invention to provide a calibration apparatus for the proper setup of package burst detectors.

It is another object and advantage of the present invention to provide a calibration and setup device to ensure that a plurality of package burst detectors can produce consistent and repeatable measurements.

These and other advantages and objects of the invention will become apparent from the appended specification and claims, and with reference to the drawings, in which:

DESCRIPTION OF THE PREFERRED EMBODIMENT

Figure 1:
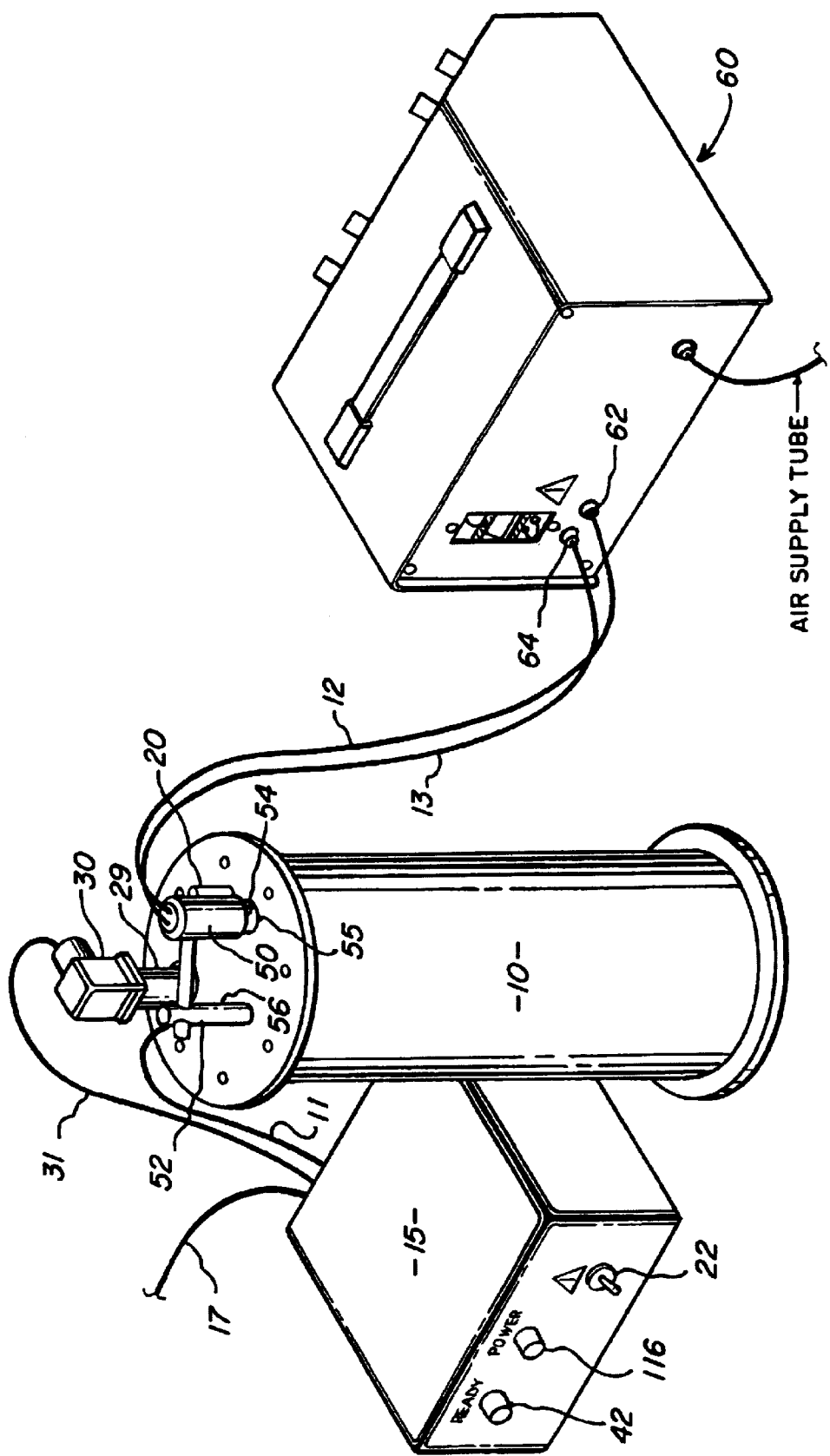
FIG. 1 shows an isometric view of the present invention, connected for testing a commercially available leak/burst tester.

Referring to the drawing figures, In the figures, like reference characters refer to the same or functionally similar parts of the respective devices illustrated in each of the figures.

FIG. 1 shows an isometric view of the invention connected to a commercially available leak/burst tester 60. A pressure tank 10 serves to simulate a package volume of a predetermined size, and is preferably made from a rigid material which does not significantly expand when pressurized to the degree required by the test and simulation process. Tank 10 has a closed top and bottom end, with a number of fixtures connected to and penetrating through the top surface. A pressure safety valve 20 is provided to provide a pressure release when and if the tank 10 becomes overpressurized; the safety valve 20 has an internal spring-loaded valve which opens at a predetermined excess pressure. An outlet fitting 29 is connected to a pressure switch 30, which provides an electrical signal over conductor 31 whenever a predetermined pressure exists inside tank 10.

The apparatus 50 for penetrating into tank 10 is mounted to the top end of pressure tank 10. The penetrating apparatus 50 is a conventional apparatus associated with a particular leak/burst detector, and is characterized by a mounting bracket 52 and a hollow needle 54, used for penetrating a package to be tested. Mounting bracket 52 is attached to the top of pressure tank 10 by a rigid post 56, which is affixed to the top cover of the tank 10. The illustration of apparatus 50 in FIG. 1 is intended to be representative of any of a number of conventional penetrating fixtures which may be used for this purpose, for penetrating a package and monitoring the pressure inside the package. In such cases, the penetrating apparatus has a lower projecting hollow needle, associated with a seal membrane 55 which is affixed to the outside surface of the package, and the needle is inserted through the seal membrane 55. In the present case, the seal membrane is affixed over an opening through the top cover of pressure tank 10, to permit the insertion of the needle into the interior of pressure tank 10.

Figure 3:
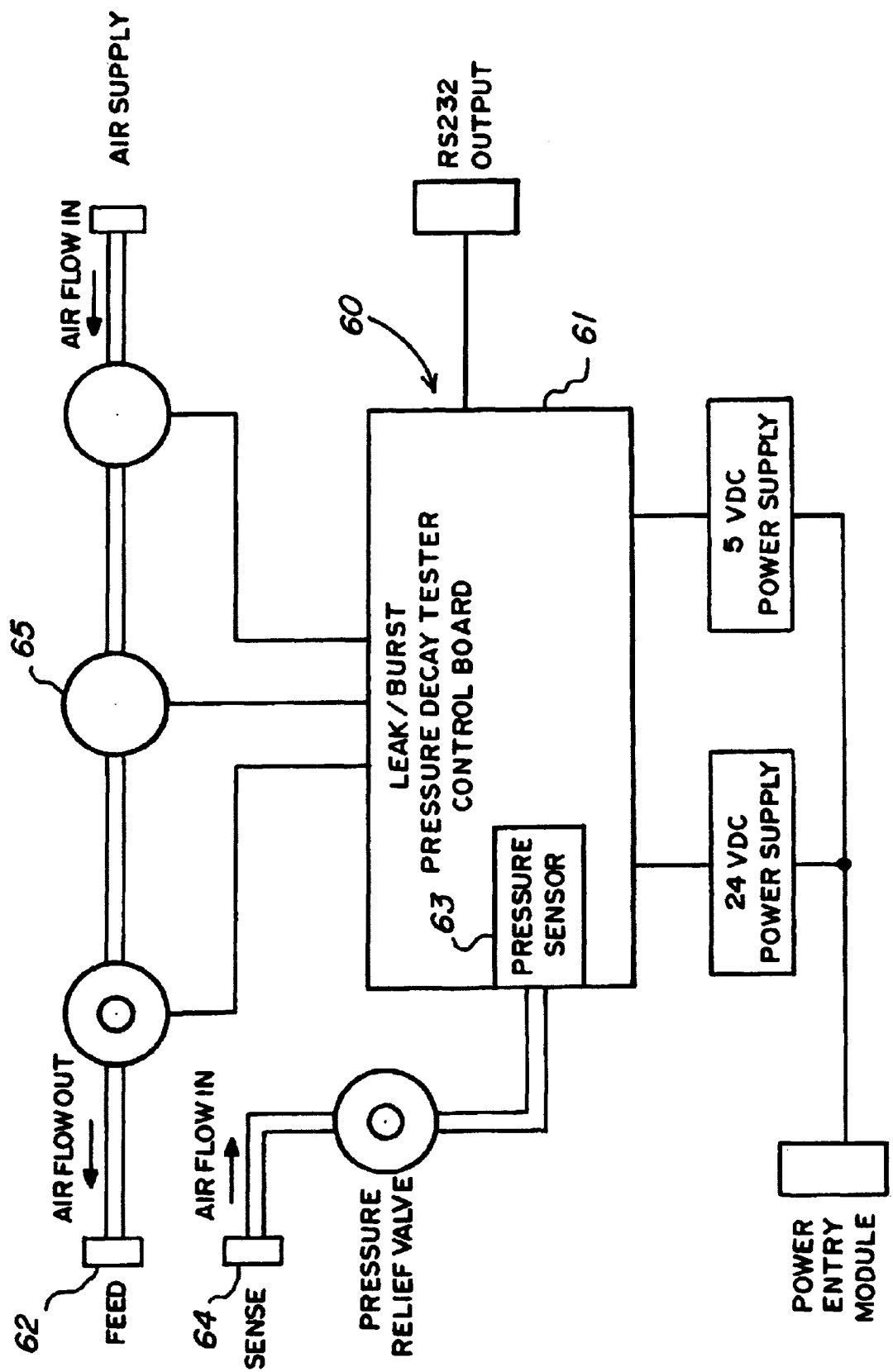
FIG. 3 shows a functional block diagram of the package burst tester with which the invention is used.

An air passage exists between the needle and an interior chamber in the penetrating fixture 50. This interior chamber is connected to an outlet port to which hoses 12 and 13 are connected. Air hose 12 is attached to an air flow outlet port 62 on leak/burst detector 60 (see FIG. 3) and air hose 13 is attached to a sensor port 64 on the leak/burst detector (see FIG. 3). Referring to FIG. 3, the leak/burst pressure detector 60 typically has an internal valve 65 to control the flow of air from an external source to the penetrating apparatus 50. An internal electronic circuit board 61 controls the various valves, and also registers the pressures detected by pressure sensor 63.

A conventional power entry module 65, such as an AC voltage receptacle, receives input power from a wall socket or the like. This power is connected to a conventional 24-volt DC power supply 66 and to a conventional 5-volt DC power supply 67, each of which supply requisite DC voltage to the electrical circuits in electronic circuit board 61.

A control box 15 (see FIG. 1) is connected to a source of AC power via wire 17, and is connected to pressure tank 10 by a vent air hose 11, and is connected to pressure switch 30 by conductor 31. Control box 15 also has an on/off switch 22 and a power indicator light 16, as well as a "ready" indicator light 42 which will be explained more fully hereinafter. Control box 15 contains the components illustrated in FIG. 4.

Figure 4:
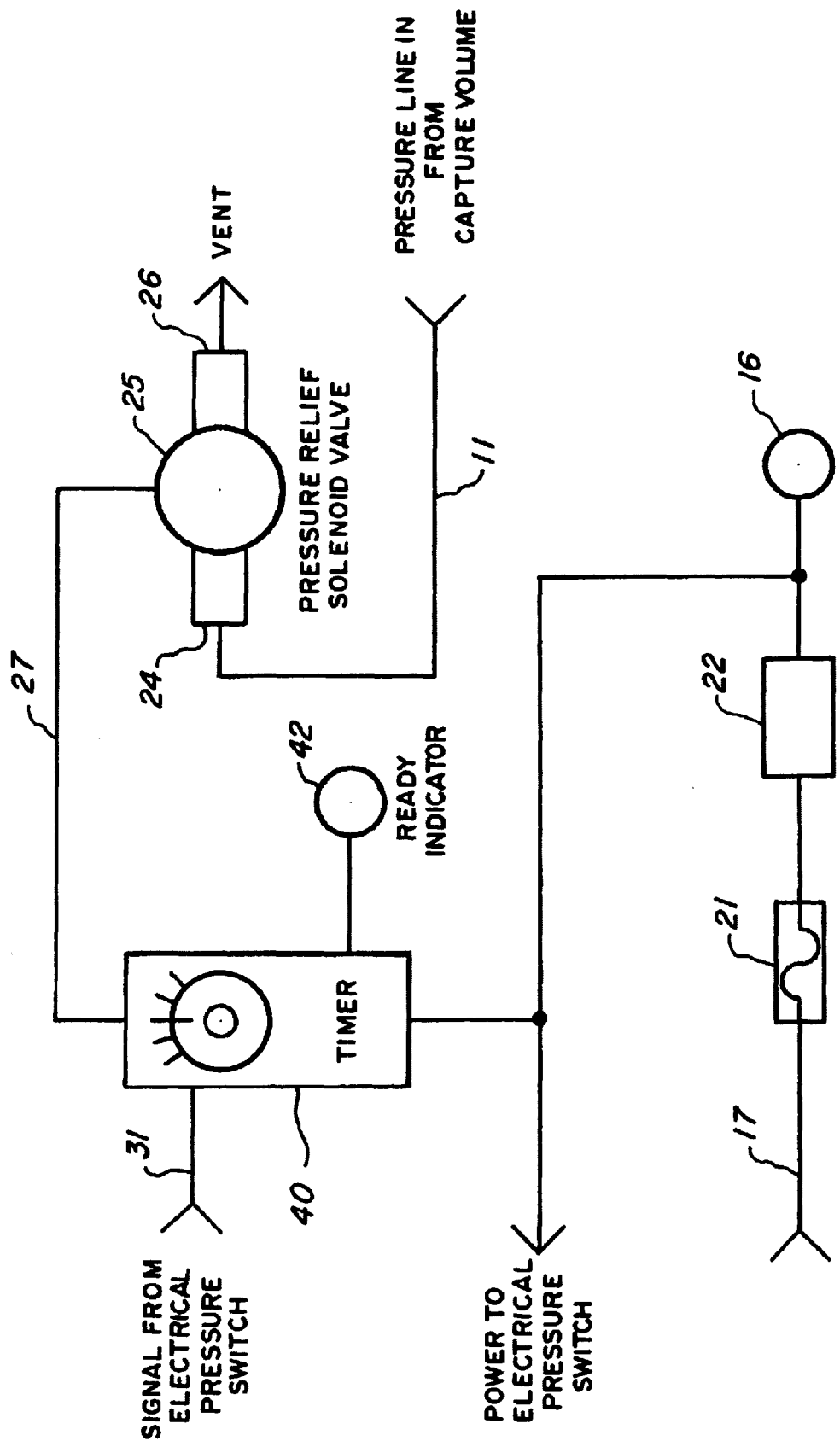
FIG. 4 shows a diagram of the electrically activated control box of the invention.

Referring to FIG. 4, the AC power line 17 is connected to a fuse 21, and then to on/off switch 22, before being connected to the various electrical components.

The air vent hose 11 is connected to an inlet port 24 of a solenoid valve 25; solenoid valve 25 has an outlet port 26 which is vented to atmosphere. Solenoid valve 25 is electrically operated, via a signal over line 27, which is connected to a timer relay 40. Timer relay 40 is in turn activated by a signal over line 31 from pressure switch 30. A "ready" indicator lamp 42 is connected to timer relay 40 to provide a visual indication when the timer relay is turned off.

Figure 2:
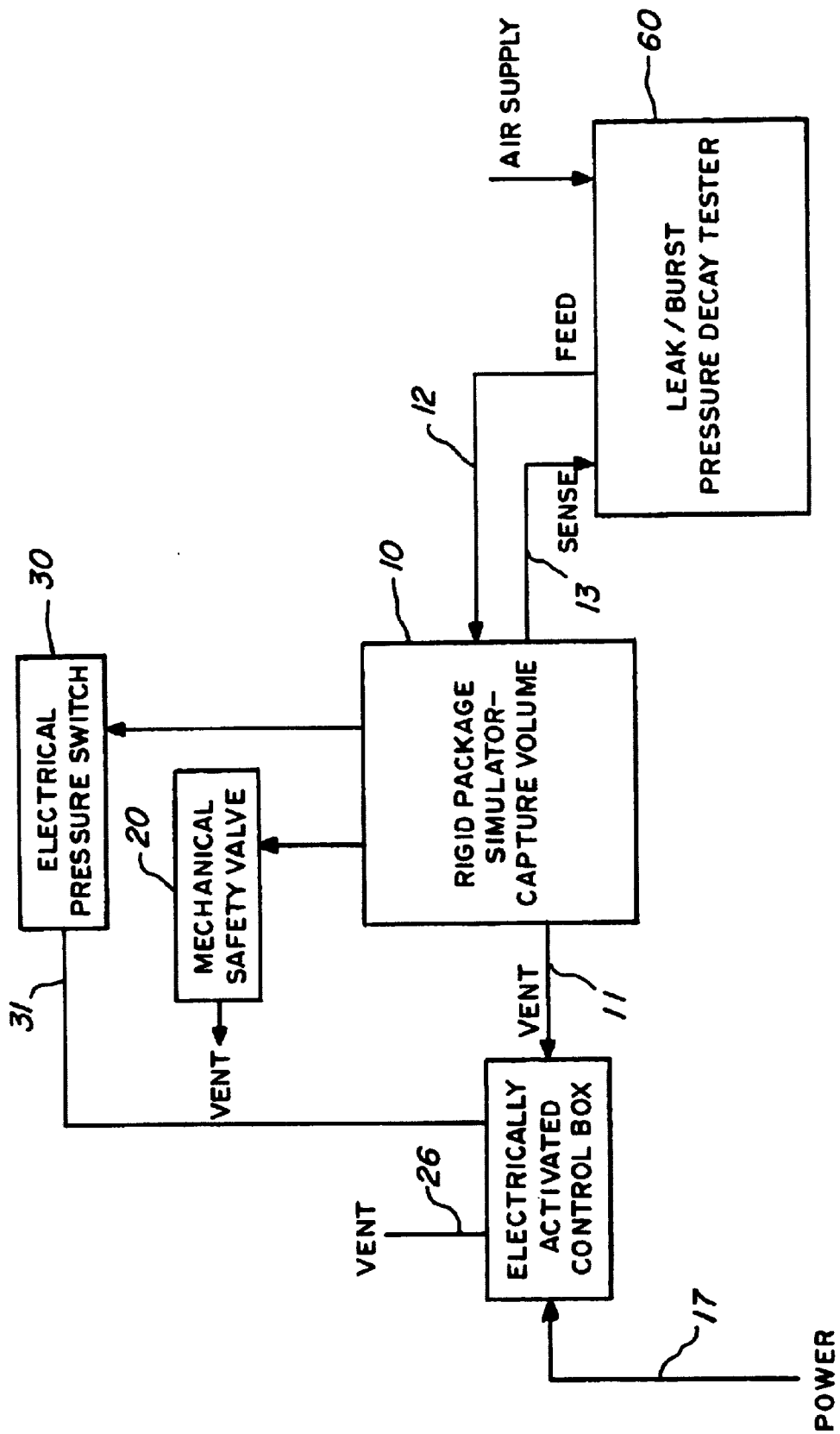
FIG. 2 shows a block diagram of the setup for using the invention in conjunction with a burst detector.

FIG. 2 shows a block diagram of the package burst pressure simulator connected to a typical and representative leak/pressure decay detector 60, of the type commonly used for purposes of testing packages for burst pressures. An air supply is connected to detector 60, and an air line 12 is connected to the pressure tank 10 for feeding pressurized air to the tank, and an air line 13 is used for monitoring the pressure inside the tank.

In operation, the systems are first connected together, as shown in FIG. 1. The control box 15 is turned on with the on/off switch 22, which in turn activates both the power indicator light 16 and the ready indicator light 42. The leak/burst pressure tester 60 is activated, and it begins to pressurize the tank 10.

When the pressure inside tank 10 equals that which has been selected for the pressure switch 30 setting, the pressure switch contacts close, and the "ready" light 42 goes out. The timer relay 40 becomes activated, which opens the pressure relief solenoid valve 25, and the pressure inside the tank is relieved to atmosphere.

When the timer cycle ends, the pressure relief solenoid valve 25 closes and the "ready" light again turns on, thus readying the simulator for another test.

During the time the tank 10 is being pressurized, the internal tank pressure is monitored by the detector 60, and is recorded. At the instant the pressure inside tank 10 is relieved, sensor 63 detects this change, and the pressure at that instant is also recorded, to provide a record of the simulated burst pressure created by the apparatus. This value may be compared to the known pressure setting for pressure switch 30, and the internal circuits of detector 60 can be readjusted if necessary, to calibrate the reading of detector 60 with the known "burst" pressure set by pressure switch 30.

The present invention may be embodied in other forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. An apparatus for simulating a predetermined burst pressure for a package burst pressure tester, comprising:
   a. a pressure tank having a first input port connectable to said burst pressure tester, for receiving a flow of pressurized air from said burst pressure tester;
   b. a second port on said pressure tank, and an electrically connected solenoid relief valve connected to said second port, said solenoid relief valve having an output port vented to atmosphere;
   c. a pressure switch on said pressure tank and connected to monitor the pressure inside said pressure tank, said pressure switch being settable to a predetermined pressure, and having means for generating an electrical signal when the pressure in said pressure tank equals the settable pressure;
   d. a presettable timer connected to said pressure switch means for generating an electrical signal, said timer having an input signal which is activated by said pressure switch electrical signal for the duration of time set into said timer, and having an output electrical signal; said timer output electrical signal connected to said solenoid relief valve; and
   e. a pressure sensor connected to said pressure tank and to said burst pressure tester, said pressure sensor having means for monitoring the pressure inside said pressure tank and means for signaling said monitored pressure to said burst pressure tester.

2. The apparatus of claim 1, further comprising, on said pressure tank, means for mounting a package penetrating fixture having a penetrating needle, a further opening into said pressure tank for insertion of said needle therethrough.

3. The apparatus of claim 2, wherein said first input port and said pressure sensor connection to said pressure tank are both made to said package penetrating fixture.

4. The apparatus of claim 3, further comprising a safety relief valve on said pressure tank.

5. A simulator for developing a calibration pressure for burst pressure testing instruments, comprising:
   a. a pressure tank having relatively inflexible outside walls, and having a top cover with at least first and second ports opening into the interior of said pressure tank;
   b. said pressure tank having a membrane covering said first port, said membrane preventing pressure leakage from said pressure tank;
   c. a pressure switch connected to said pressure tank, having means for monitoring the internal pressure in said pressure tank, and having means for setting a preset pressure level, and having an electrical output line which is activated upon detecting an internal tank pressure equal to said preset pressure level;

d. a solenoid-operated valve having a valve port connected to said pressure tank second port, and having a valve port connected to atmosphere; said valve solenoid being connected to said pressure switch electrical output line; whereby said valve is activated by a signal from said output line; and e. a penetrating fixture having a hollow needle for penetrating said membrane, said fixture having connections to said burst pressure testing instrument, for passing pressurized air into said pressure tank and for monitoring the pressure inside said pressure tank.

6. The apparatus of claim 5, further comprising a timer connected to said pressure switch electrical output line and to said valve solenoid, said timer having means for presetting a time and means for deactivating said solenoid at the end of a time duration set by said means for presetting a time.

7. The apparatus of claim 6, further comprising a pressure safety relief valve connected to said pressure tank.

8. A method for simulating a package pressure burst condition, for calibrating a pressure burst detector, comprising the steps of:

a. connecting said pressure burst detector to a pressure tank and activating said pressure burst detector to gradually increase the pressure in said pressure tank; and b. connecting a pressure relief port to said tank to a pressure relief valve which is vented to atmosphere, and monitoring said tank pressure with a pressure switch which activates said pressure relief valve at a preset pressure; and c. sensing the pressure in said pressure tank with said pressure burst detector and recording the sensed pressure when said pressure switch activates said pressure relief valve.

9. The method of claim 8, further comprising the step of activating said pressure relief valve for a predetermined time after said pressure switch activates said pressure relief valve.

* * * * *

UNITED STATES PATENT AND TRADEMARK OFFICE
CERTIFICATE OF CORRECTION

PATENT NO.    : 6,640,614 B1
DATED         : November 4, 2003
INVENTOR(S)   : Bode et al.

It is certified that error appears in the above-identified patent and that said Letters Patent is hereby corrected as shown below:

Title page,
Item [73], Assignee, change "Molon, Inc.", to -- MOCON, Inc., --.

Signed and Sealed this

Thirtieth Day of August, 2005

JON W. DUDAS
*Director of the United States Patent and Trademark Office*